United States Patent
Keller et al.

(10) Patent No.: US 7,916,146 B1
(45) Date of Patent: Mar. 29, 2011

(54) HALT CONTEXT SWITCHING METHOD AND SYSTEM

(75) Inventors: Robert C. Keller, Palo Alto, CA (US); Michael C. Shebanow, Saratoga, CA (US); Makarand M. Dharmapurikar, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 621 days.

(21) Appl. No.: 11/292,471

(22) Filed: Dec. 2, 2005

(51) Int. Cl.
*G06T 1/20* (2006.01)
(52) U.S. Cl. ...................................... 345/506
(58) Field of Classification Search .................. 345/506
See application file for complete search history.

(56) References Cited

U.S. PATENT DOCUMENTS

| | | | |
|---|---|---|---|
| 5,150,469 A | 9/1992 | Jouppi | |
| 5,752,031 A | 5/1998 | Cutler et al. | |
| 5,872,962 A | 2/1999 | Hisanaga et al. | |
| 5,933,627 A | 8/1999 | Parady | |
| 6,018,759 A | 1/2000 | Doing et al. | |
| 6,075,546 A * | 6/2000 | Hussain et al. | 345/522 |
| 6,223,208 B1 | 4/2001 | Kiefer et al. | |
| 6,229,553 B1 * | 5/2001 | Duluk et al. | 345/506 |
| 6,323,867 B1 * | 11/2001 | Nookala et al. | 345/522 |
| 6,401,155 B1 | 6/2002 | Saville et al. | |
| 6,762,764 B2 * | 7/2004 | Hiwada et al. | 345/506 |
| 6,801,202 B2 * | 10/2004 | Nelson et al. | 345/505 |
| 2003/0169259 A1 * | 9/2003 | Lavelle et al. | 345/501 |
| 2004/0008200 A1 * | 1/2004 | Naegle et al. | 345/505 |
| 2007/0043916 A1 | 2/2007 | Aguilar et al. | |

* cited by examiner

*Primary Examiner* — Xiao M Wu
*Assistant Examiner* — Edward Martello
(74) *Attorney, Agent, or Firm* — Patterson & Sheridan, LLP.

(57) ABSTRACT

In a processing pipeline having a plurality of units, an interface unit is provided between a first, upstream pipeline unit that needs to be drained prior to a context switch and a second, downstream pipeline unit that might halt prior to a context switch. The interface unit redirects data that are drained from the first pipeline unit and to be received by the second pipeline unit, to a buffer memory provided in the front end of the processing pipeline. The contents of the buffer memory are subsequently dumped into memory reserved for the context that is being stored. When the processing pipeline is restored with this context, the data that were dumped into memory are retrieved back into the buffer memory and provided to the interface unit. The interface unit receives these commands and directs them to the second pipeline unit.

12 Claims, 9 Drawing Sheets

HALT CONTEXT SWITCHING METHOD AND SYSTEM

BACKGROUND OF THE INVENTION

1. Field of the Invention

Embodiments of the present invention relate generally to context switching and, more particularly, to a method and a system for context switching a processing pipeline based on a halt protocol.

2. Description of the Related Art

A context switch is a feature of a multitasking operating system that allows for a switch in execution from one computing thread or process to another. This feature ensures that a processor cannot be monopolized by any one processor-intensive thread or process. During a context switch, the states of the processor of the currently running process are stored in memory and the processor is restored with states of another process that was previously stored in memory.

In graphics applications, a number of threads may be mutiprocessed through one or more graphics pipelines that are managed by a graphics processing unit (GPU). FIG. 1 is a simplified block diagram of a computer system 100 that includes a graphics pipeline 126 within a GPU 120. In addition to the graphics pipeline 126, the GPU 120 is shown to include a host unit 122, a front end (FE) 124, and a memory interface 128. The host unit 122 schedules the processing of different threads through the graphics pipeline 126, and the FE 124 manages the context switching for the graphics pipeline 126. Each of the host unit 122, the FE 124 and the graphics pipeline 126 has access to a local graphics memory 130, e.g., a frame buffer, through the memory interface 128. The GPU 120 and the local graphics memory 130 represent a graphics subsystem that is accessed by a central processing unit (CPU) 110 of the computer system 100 using a driver that is stored in a system memory 112.

A context switch does not occur immediately upon a command from the host unit 122. When the FE 124 receives a context switch command from the host unit 122, it may perform context switching in accordance with a predefined protocol, e.g., the wait-for-idle (WFI) protocol or the halt sequencing protocol. According to the WFI protocol, the FE 124 suspends sending commands down the graphics pipeline 126 and then waits for an idle status signal from each of the units of the graphics pipeline 126. A context switch occurs only after the FE 124 receives an idle status signal from each of the units of the graphics pipeline 126. This ensures that the graphics pipeline 126 is completely drained prior to the context switch.

According to the halt sequencing protocol, the FE 124 suspends sending commands down the graphics pipeline 126 and issues a halt request signal to the units of graphics pipeline 126, which report back their status as being idle, halted or neither. When all of the units of graphics pipeline 126 report their status as being idle or halted, the FE 124 issues a freeze signal to them. After the units of graphics pipeline 126 have been frozen, the FE 124 performs the context switch. The halt sequencing protocol is described in detail in U.S. application Ser. No. 11/252,855, entitled "Context Switching using Halt Sequencing Protocol," filed Oct. 18, 2005, the entire contents of which are incorporated by reference herein.

The halt sequencing protocol enables dynamic page memory management by allowing a unit of the graphics pipeline 126 to go into a halted state when a page fault is generated in response to a memory access and then performing a context switch to another process. Halting a unit, however, may cause problems if a unit that is directly upstream in the graphics pipeline 126 continues to send data down to the halted unit. This may happen, for example, when the downstream unit goes into a halted state because it has no other choice (e.g., a page fault was generated in response to a memory request) but the upstream unit continues to send data down to the halted unit because the upstream unit cannot be halted and needs to drain completely before it can be context switched.

SUMMARY OF THE INVENTION

The present invention provides a method and a system for context switching a processing pipeline based on a halt protocol. According to an embodiment of the present invention, an interface unit is provided between a first, upstream pipeline unit that needs to be drained prior to a context switch and a second, downstream pipeline unit that might halt prior to a context switch. The interface unit redirects data that are drained from the first pipeline unit and to be received by the second pipeline unit, to a buffer memory provided in the front end of the processing pipeline. The contents of the buffer memory are subsequently dumped into memory reserved for the halted context. When the processing pipeline is restored with this context, the data that were dumped into memory are retrieved back into the buffer memory and provided to the interface unit. The interface unit receives such data and directs them to the second pipeline unit.

In embodiments of the present invention where there are multiple interface units that carry out the functions described above, a set of three buses may be provided to interconnect these interface units to an arbiter that is provided in the front end of the processing pipeline. The first bus is a data bus that carries data between the interface units and the buffer memory. The second bus is a mode control bus that indicates one of three modes: normal, spill, and replay. In the normal mode, the interface unit functions as a pass-through device that allows data from the upstream pipeline unit to flow into the downstream pipeline unit. In the spill mode, the interface unit redirects the data from the upstream pipeline unit that are to be received by the downstream pipeline unit to the buffer memory. In the replay mode, the interface unit receives data from the buffer memory and provides them to the downstream pipeline unit. The third bus is a token bus that carries around tokens that indicate available buffer memory space at the front end or at the interface units.

During the spill mode, tokens are issued by the arbiter in proportion to the amount of space that is available in the buffer memory provided in the front end. Additional tokens are issued as more space becomes available in the buffer memory as a result of data being moved out of the buffer memory and into the memory reserved for the halted context. The interface units redirect data to the buffer memory in accordance with the issued tokens.

During the replay mode, tokens are issued by each of the interface units in proportion to the amount of space that is available in their respective buffer memories. Additional tokens are issued by the interface units as more space becomes available in their buffer memories as a result of data being moved out of them and provided to their respective downstream pipeline units. The arbiter sends data to the interface units in accordance with the issued tokens.

By using the methods and systems according to various embodiments of the present invention, context switching of a processing pipeline based on a halt sequencing protocol may be carried out reliably even when a pipeline unit that goes into a halted state stops accepting data from an upstream pipeline unit. The data from the upstream pipeline unit are redirected into a buffer memory by an interface unit and subsequently stored in memory reserved for the halted context. When this context is restored in the processing pipeline, the data stored in memory are retrieved into the buffer memory and provided to the interface unit, which directs them to the pipeline unit that was previously halted.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 2:
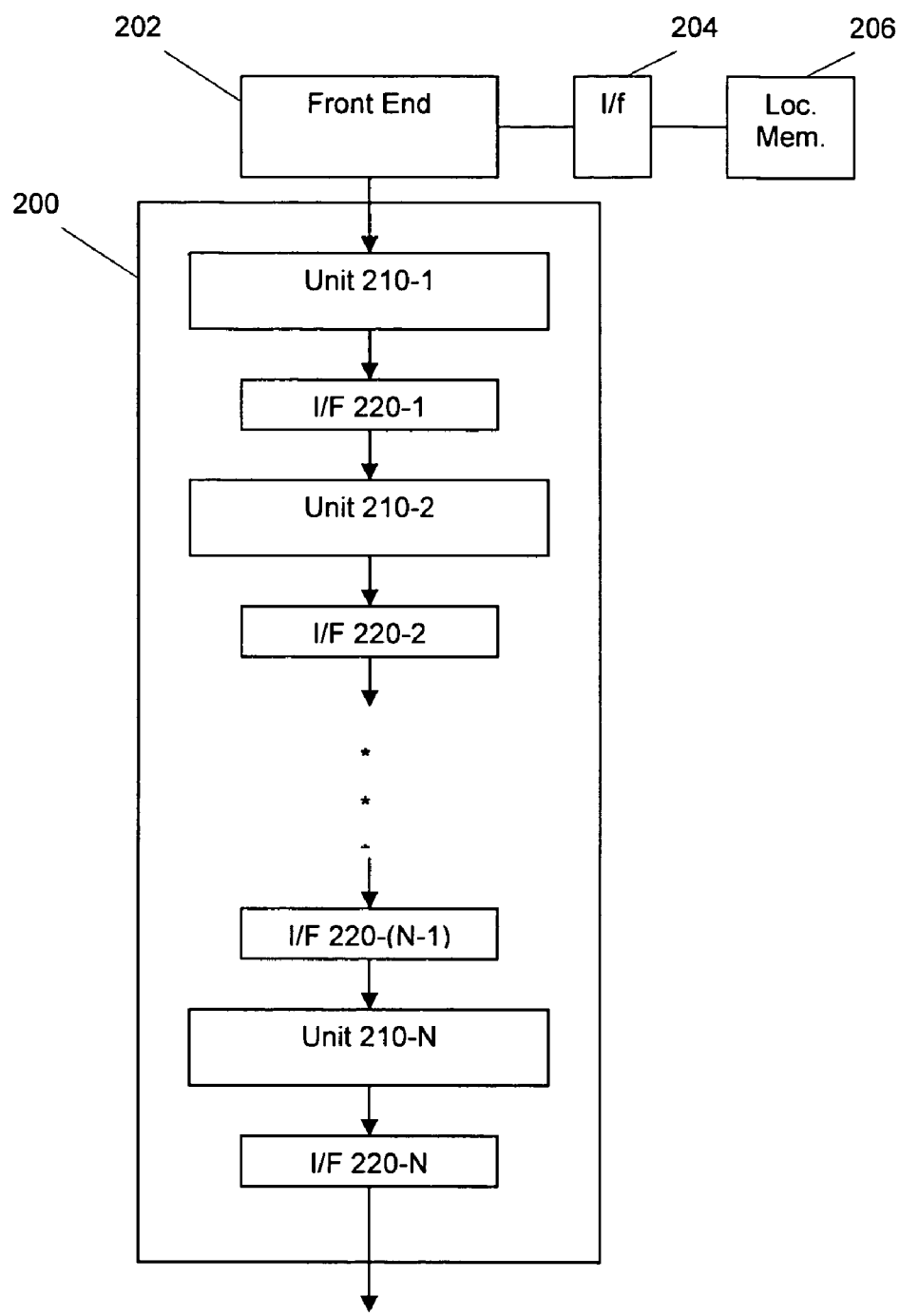
FIG. 2 is a block diagram of a processing pipeline that includes interface units below pipeline units.

FIG. 2 is a block diagram of a processing pipeline 200 that includes interface units 220-1, 220-2, ..., 220-N (collectively referred to as interface units 220) below pipeline units 210-1, 210-2, ..., 210-N (collectively referred to as pipeline units 210). FIG. 2 also shows a front end (FE) 202, which manages the context switching for the processing pipeline 200. When the FE 202 receives a context switch command from a host unit, the FE 202 suspends sending commands down the processing pipeline 200 and issues a halt request signal to the pipeline units 210, which report back their status as being idle, halted or neither. When all of the pipeline units 210 report their status as being idle or halted, the FE 202 issues a freeze signal to them. After the pipeline units 210 have been frozen, the FE 202 stores the context associated with the currently running process into memory reserved for that context, and restores the processing pipeline 200 to the context associated with another process after such context is retrieved from memory reserved for that context. Each context has a memory region reserved for it in a memory 206 and is accessed through a memory interface 204, and such memory region is commonly referred to as a context buffer.

Figure 1:
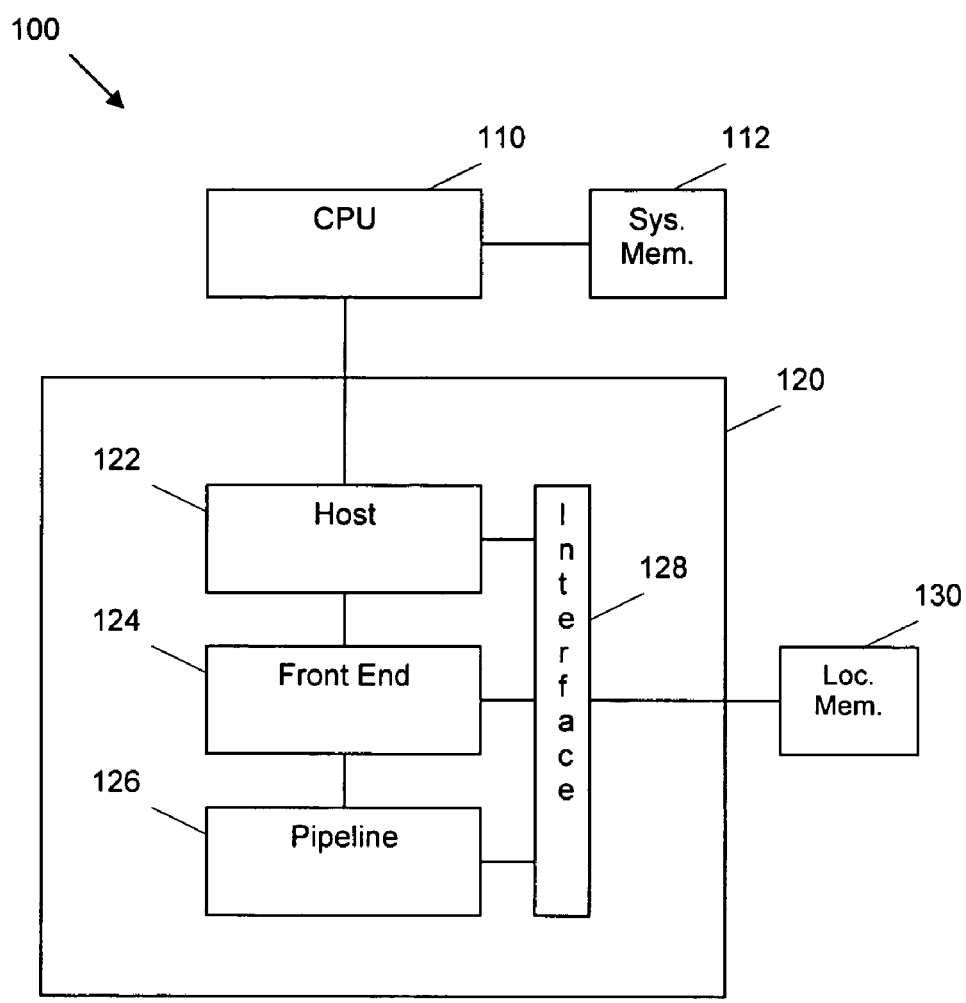
FIG. 1 is a simplified block diagram of a computer system implementing a graphics pipeline.

One example of the processing pipeline 200 may be any one of the graphics pipelines 126 of FIG. 1. When the processing pipeline 200 is one of the graphics pipelines 126 of FIG. 1, the memory 206 may be the local graphics memory 130. In some embodiments, the memory 206 may be the system memory 112. The processing pipeline 200 is also not limited to a graphics pipeline and may be a processing pipeline of a CPU or any other processing unit of a computer system.

Figure 3:
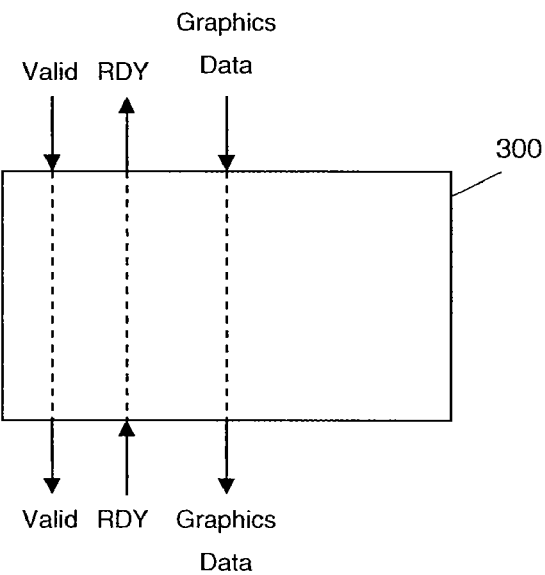
FIG. 3 illustrates one type of an interface unit shown in FIG. 2.

The interface units 220 are of two types. The first type is shown in FIG. 3, and is identified with the reference number 300. The interface unit 300 functions as a pass-through device. It passes through a valid bit from an upstream pipeline unit to a downstream pipeline unit and a ready (RDY) bit from the downstream pipeline unit to the upstream pipeline unit. When both the valid bit and the ready bit are high, the upstream pipeline unit sends data to the downstream pipeline unit through the interface unit 220.

Figure 4:
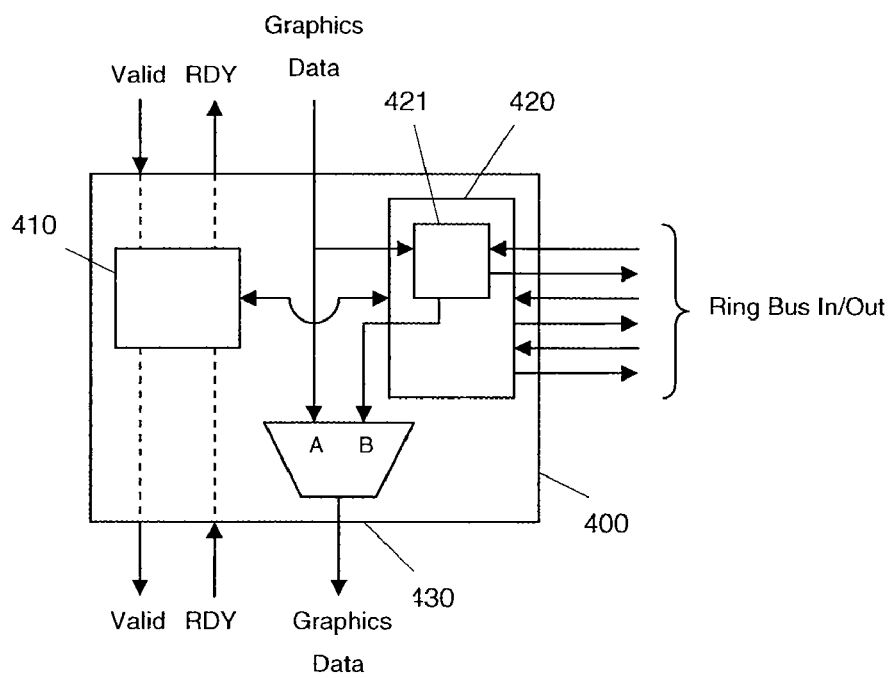
FIG. 4 illustrates another type of an interface unit shown in FIG. 2.

The second type of the interface units 220 is shown in FIG. 4, and is identified with the reference number 400. The interface unit 400 will also be referred to herein as a "spill interface." The spill interface 400 operates in one of three modes: normal mode, spill mode and replay mode. In the normal mode, the spill interface 400 functions as a pass-through device, just like the interface unit 300, and allows data from the upstream pipeline unit to flow into the downstream pipeline unit when both the valid bit and the ready bit are high. In the spill mode, the spill interface 400 redirects the data from the upstream pipeline unit that are to be received by the downstream pipeline unit to the FE 202 through a ring bus. The data transmitted through the ring bus during the spill mode from the spill interface 400 to the FE 202 will be referred to herein as "spill data." In the replay mode, the spill interface 400 receives data from the FE 202 through the ring bus and provides them to the downstream pipeline unit. The data transmitted through the ring bus during the replay mode from the FE 202 to the spill interface 400 will be referred to herein as "replay data."

FIG. 4 illustrates several components that enable the spill interface 400 to operate in the various modes. These components include a first logic unit 410, a second logic unit 420, and a multiplexer 430. When the spill interface 400 is in the normal mode, the first logic unit 410 passes on the valid bit from the upstream pipeline unit to the downstream pipeline unit and passes on the ready bit from the downstream pipeline unit to the upstream pipeline unit, and the multiplexer 430 enables its input A so that data from the upstream pipeline unit are passed onto the downstream pipeline unit. When the spill interface 400 is in the spill mode, the second logic unit 420 buffers the data from the upstream pipeline unit in a first-in, first-out (FIFO) memory 421, and then transmits them onto the ring bus. The transmitted data include n-bits (e.g., five bits) for identifying the spill interface 400, hereinafter referred to as the "spill interface ID," so that when they arrive at the FE 202, the FE 202 can associate the transmitted data with their source.

When the spill interface 400 is in the replay mode, it examines the spill interface ID of the data on the ring bus to see if it matches its spill interface ID. If there is a match, the spill interface 400 removes the data from the ring bus, places the data in its FIFO memory 421, and transmits them onto the downstream pipeline unit through the multiplexer 430, which has its input B enabled during the replay mode. If there is no match, the spill interface 400 passes on the data to the next spill interface connected to the ring bus.

Figure 5:
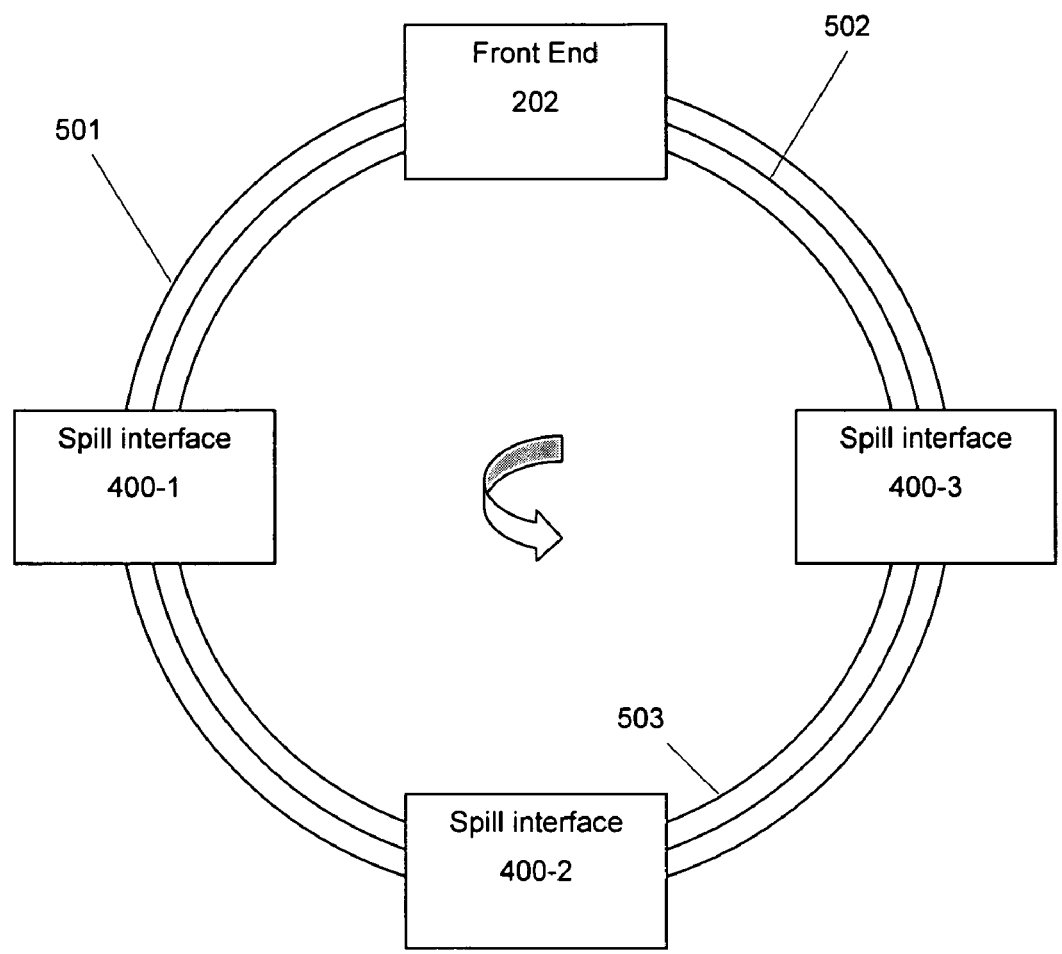
FIG. 5 is a block diagram that illustrates ring buses that connect the interface units of the type shown in FIG. 4.

FIG. 5 illustrates three ring buses 501, 502, 503 that communicate three types of signals between the FE 202 and each of the spill interfaces 400. In the example illustrated in FIG. 5, three spill interfaces 400-1, 400-2 and 400-3 are shown, but the present invention is applicable to any number of spill interfaces, including one. The first ring bus is a data bus 501 that carries the data between the spill interfaces 400-1, 400-2, 400-3 and the FE 202. The second ring bus is a mode control bus 502 that indicates one of three operating modes for the spill interfaces 400-1, 400-2, 400-3, i.e., normal, spill and replay. The third ring bus is a token bus 503 that carries tokens indicative of the amount of buffer memory space that is available in the FE 202 during the spill mode, and the amount of buffer memory space that is available in the individual spill interfaces 400-1, 400-2, 400-3 during the replay mode. The token bus 503 is a slotted ring bus, i.e., a ring bus with a plurality of transmission slots that travel around the ring at the system clock rate.

Figure 6:
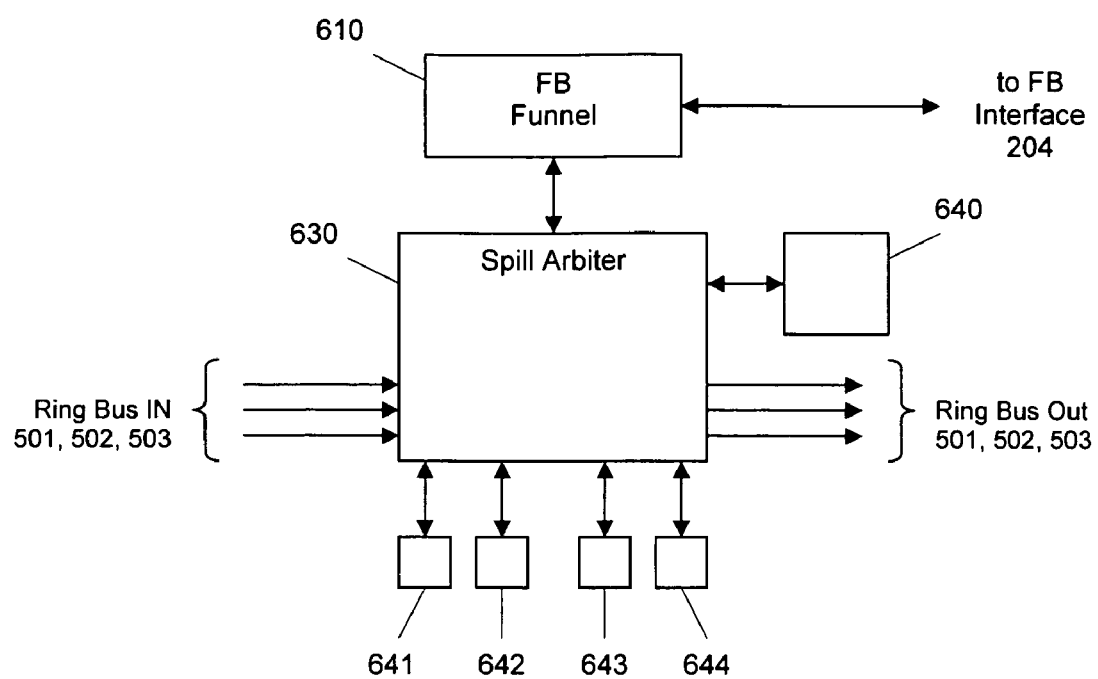
FIG. 6 is a block diagram of the front end shown in FIG. 2.

FIG. 6 is a more detailed block diagram of the FE 202 and shows a spill arbiter 630 that is connected to the three ring buses 501, 502, 503. The spill arbiter 630 is connected to a buffer memory 640 that stores the spill data and the replay data. The buffer memory is configured as a FIFO memory. The spill arbiter 630 is also connected to register memories 641, 642, 643, 644. One set of register memories 641, 642, 643, 644 is provided for each spill interface 400, and the association between a particular spill interface 400 with a particular set of register memories 641, 642, 643, 644 is maintained by the spill arbiter 630. FIG. 6 also shows a frame buffer (FB) funnel 610. The FB funnel 610 is connected to a frame buffer (e.g., the memory 206) through an FB interface (e.g., the memory interface 204). Memory accesses to the frame buffer made by the FE 202, e.g., when accessing the context buffers, are made through the FB funnel 610.

Each spill interface 400 is allocated a memory region of a fixed size in the context buffer. The head address of this memory region is stored in the register memory 641 and is defined relative to the memory location of the context buffer. The size of this memory region is stored in the register memory 642. The table below provides an example of how the memory regions for the spill interfaces 400-1, 400-2, 400-3 shown in FIG. 5 are defined by the registers 641, 642 for two different contexts, Context A and Context B. In the example, the memory location of the context buffer for Context A is X and the memory location of the context buffer for Context B is Y.

| Context A | Register 641 | Start Address | Register 642 | End Address |
|---|---|---|---|---|
| 400-1 | 1010 | X + 1010 | 20 | X + 1029 |
| 400-2 | 1030 | X + 1030 | 50 | X + 1079 |
| 400-3 | 1080 | X + 1080 | 10 | X + 1089 |

| Context B | Register 641 | Start Address | Register 642 | End Address |
|---|---|---|---|---|
| 400-1 | 1010 | Y + 1010 | 20 | Y + 1029 |
| 400-2 | 1030 | Y + 1030 | 50 | Y + 1079 |
| 400-3 | 1080 | Y + 1080 | 10 | Y + 1089 |

As shown in the example above, the head address stored in the register memory 641 and the size value stored in the register memory 642 do not vary from context to context. However, since the head address is defined relative to the memory location of the context buffer, the memory regions allocated to the spill interfaces 400 do differ from context to context in absolute terms.

The register memory 643 for a spill interface stores a count of the n-bit data (e.g., 32-bit words) that are moved out of the buffer memory 640 and stored in the memory region for that spill interface. This value is initialized as zero and incremented during the spill mode, and is referred to as the spill count. The register memory 644 for a spill interface stores a count of the n-bit data (e.g., 32-bit words) that are retrieved from the memory region for that spill interface and stored in the buffer memory 640. This value is initialized as zero and incremented during the replay mode, and is referred to as the replay pointer. When all n-bit data are retrieved from the memory region for a spill interface and stored the buffer memory 640, such that the spill count stored in the register memory 643 equals the replay pointer stored in the register memory 644, this signifies that replay has completed for that spill interface and both values are reset to zero. The values stored in both register memories 643, 644 are saved and restored as states during a context switch. By contrast, the values stored in the register memories 641, 642 are not saved and restored during a context switch, because these values do not vary from context to context.

In the embodiments of the present invention illustrated herein, each memory region allocated to the spill interfaces 400 is defined with a head address and a corresponding size. Other schemes are possible as well. For example, each memory region allocated to the spill interfaces 400 may be defined with a head address and a tail address. Also, head addresses and sizes of the spill interface memory regions need not be stored in register memories. Instead, they may be hard wired into the design of the FE 202.

The spill arbiter 630 is responsible for communicating the current mode of operation to the spill interfaces 400 over the mode control bus 502. When the processing pipeline 200 is operating normally, i.e., a context switch is not pending, the spill arbiter 630 communicates the normal mode over the mode control bus 502. After the FE 202 receives a context switch command and before the context switch is made, the mode of operation goes from the normal mode to the spill mode and then back to the normal mode. After returning to the normal mode, the context switch is made. Then, after the context switch is made, the mode of operation goes from the normal mode to the replay mode and then, when replay for all spill interfaces have been completed, back to the normal mode.

During the spill mode, the spill arbiter 630 issues tokens that are indicative of the amount of buffer memory space that is available in the buffer memory 640 onto the token bus 503. Before any of the spill interfaces 400 send any data to be stored in the buffer memory 640, it examines the token bus 503 for tokens. When it finds a token, it examines the token to determine the amount of buffer memory space available in the buffer memory 640, sends spill data up to the determined amount, and removes the token from the token bus 503 altogether (if it used all the available space) or decreases the amount of available space indicated by the token and places the token back on the token bus 503 (if it used less than all the available space).

During the replay mode, each of the spill interfaces 400 issues tokens onto free slots of the token bus 503. A token issued by a spill interface during the replay mode indicates the amount of available buffer memory space in the FIFO memory 421 of that spill interface, and includes the spill interface ID of that spill interface. These tokens travel on the token bus 503 and are consumed by the FE 202. The spill arbiter 630 examines these tokens to determine the amount of buffer memory space available in each of the spill interfaces 400, and sends replay data to the spill interfaces 400 up to the determined amount. After sending the replay data to a particular spill interface, the spill arbiter 630 interprets a receipt of another token from that same spill interface as confirmation that the replay data that were sent to that spill interface were successfully received by that spill interface.

Figure 7:
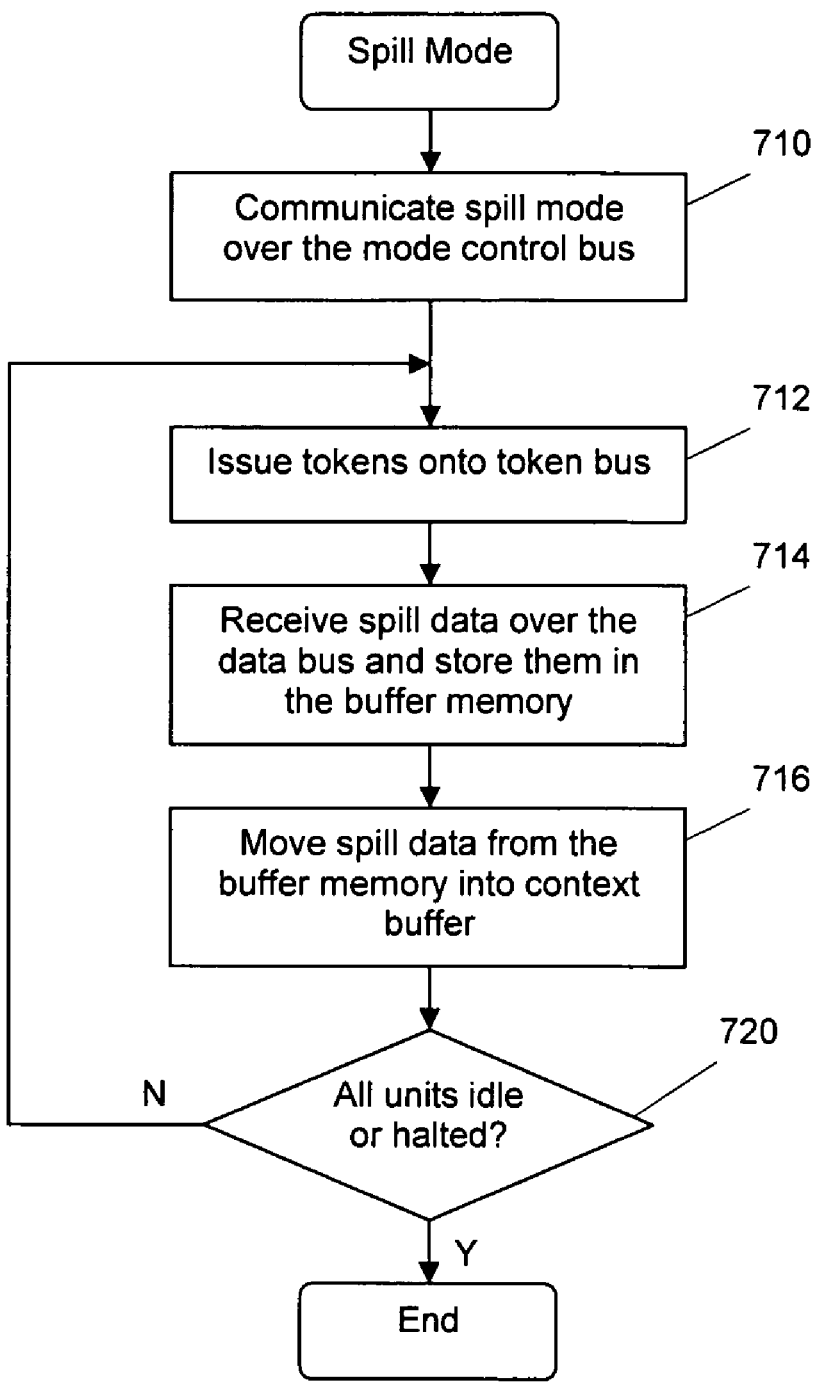
FIG. 7 is a flow diagram that illustrates the process steps carried out at the front end during a spill mode of operation.

FIG. 7 is a flow diagram that illustrates the process steps carried out by the spill arbiter 630 during the spill mode. The spill arbiter 630 enters the spill mode when the FE 202 receives a context switch command from its associated host unit. In step 710, the spill arbiter 630 communicates the spill mode to all the spill interfaces 400 over the mode control bus 502. Then, the spill arbiter 630 issues tokens onto the token bus 503 (step 712). The tokens are passed around to the spill interfaces 400. When a spill interface has spill data that it needs to transmit onto the data bus 501, it checks the token and determines the amount of available buffer memory space indicated by the token, and transmits spill data onto the data bus 501 up to the determined amount. In step 714, the spill arbiter 630 receives the spill data transmitted onto the data bus 501 by various spill interfaces and stores them in the buffer memory 640. In step 716, the spill arbiter 630 moves the spill data stored in the buffer memory 640 into the context buffer at a memory location that is equal to the head address stored in the register 641+the spill count stored in the register 643. It also updates the spill count stored in the register 643. The spill mode ends when all units of the processing pipeline 200 indicate that they are either idle or halted (step 720). Otherwise, the flow returns to step 712, where the spill arbiter 630 issues more tokens based on the amount of buffer memory space that it freed and continues to receive commands from the spill interfaces 400 in step 714.

When the spill mode ends, the FE 202 performs its customary storing of the context associated with the current process in the context buffer for the current process. When a context switch is made to a different process, the context associated with the different process is retrieved from the context buffer for the different process and the processing pipeline 200 is restored with the retrieved context, and the replay mode is initiated.

In the replay mode, the spill arbiter 630 retrieves replay data from the context buffer for the new process and transmits them to the spill interfaces 400 from which they were received, and the spill interfaces 400 subsequently supply the replay data to their respective downstream pipeline units through the multiplexer 430. When a spill interface receives all of its replay data from the spill arbiter 630 and supplies them to its downstream pipeline unit, the replay process for that spill interface is considered complete, i.e., that spill interface has been replayed.

Figure 8:
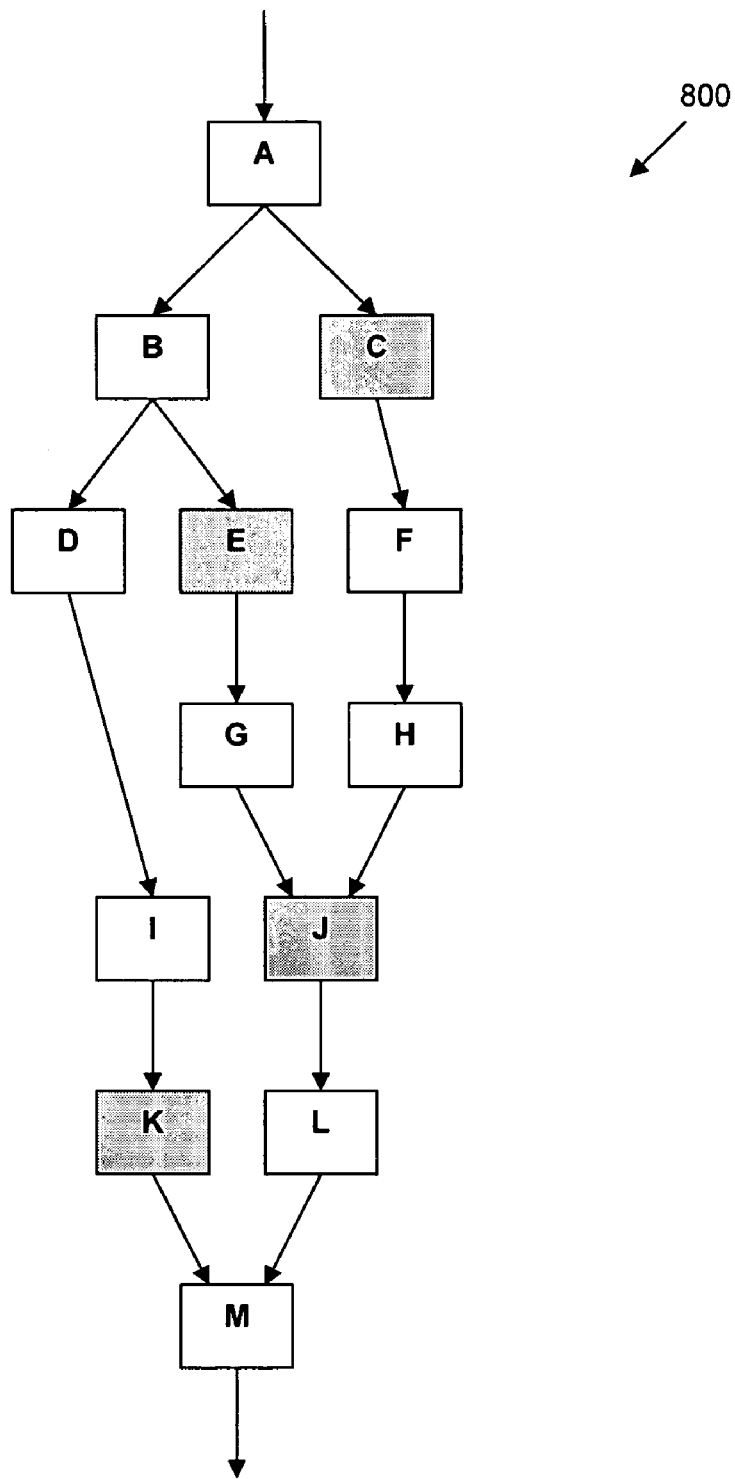
FIG. 8 is a block diagram of a processing pipeline that requires context to be restored in an ordered manner.

During the replay mode, the spill interfaces 400 are replayed in a predetermined order to avoid deadlock in the processing pipeline 200. FIG. 8 is a sample graphics pipeline 800 that requires the replay process to be carried out in a predetermined order. The graphics pipeline 800 begins with unit A and ends with unit M. Units C, E, J and K are haltable units and are illustrated in gray. Spill interfaces are provided above these units but for simplicity are not illustrated in FIG. 8. These spill interfaces will be referred to herein as AC, BE, GJ, HJ and IK to reflect the letters associated with their respective upstream and downstream units. In the graphics pipeline 800, spill interface AC cannot be replayed until spill interface HJ has been replayed, and spill interface BE cannot be replayed until spill interface GJ has been replayed. There are no such limitations as to when spill interfaces GJ, HJ and IK can be replayed.

The order of replay may be implemented in hardware or software. In the embodiment of the present invention described herein, the processing pipeline 200 and the spill interfaces 400 are configured in hardware such that each of the spill interfaces 400 belongs to one and only one replay group (RG), and a completion set (CS) and an activation set (AS) are defined for each replay group. The completion set for a replay group includes all spill interfaces in that replay group. The activation set for a replay group includes a set of spill interfaces that can begin replay once this replay group has completed replay. The activation set for a replay group may be empty. An initial activation set (IAS) is also defined. The initial activation set is the set of spill interfaces that begin replay as soon as the replay mode is entered. For the graphics pipeline 800 illustrated in FIG. 8, the initial activation set includes spill interface IK, GJ and HJ, and the replay groups, completion set and the activation set are defined as set forth in the following table:

| Replay Group | Completion Set | Activation Set |
|---|---|---|
| IK | IK | Null |
| GJ | GJ | BE |
| BE | BE | Null |
| HJ | HJ | AC |
| AC | AC | Null |

Figure 9:
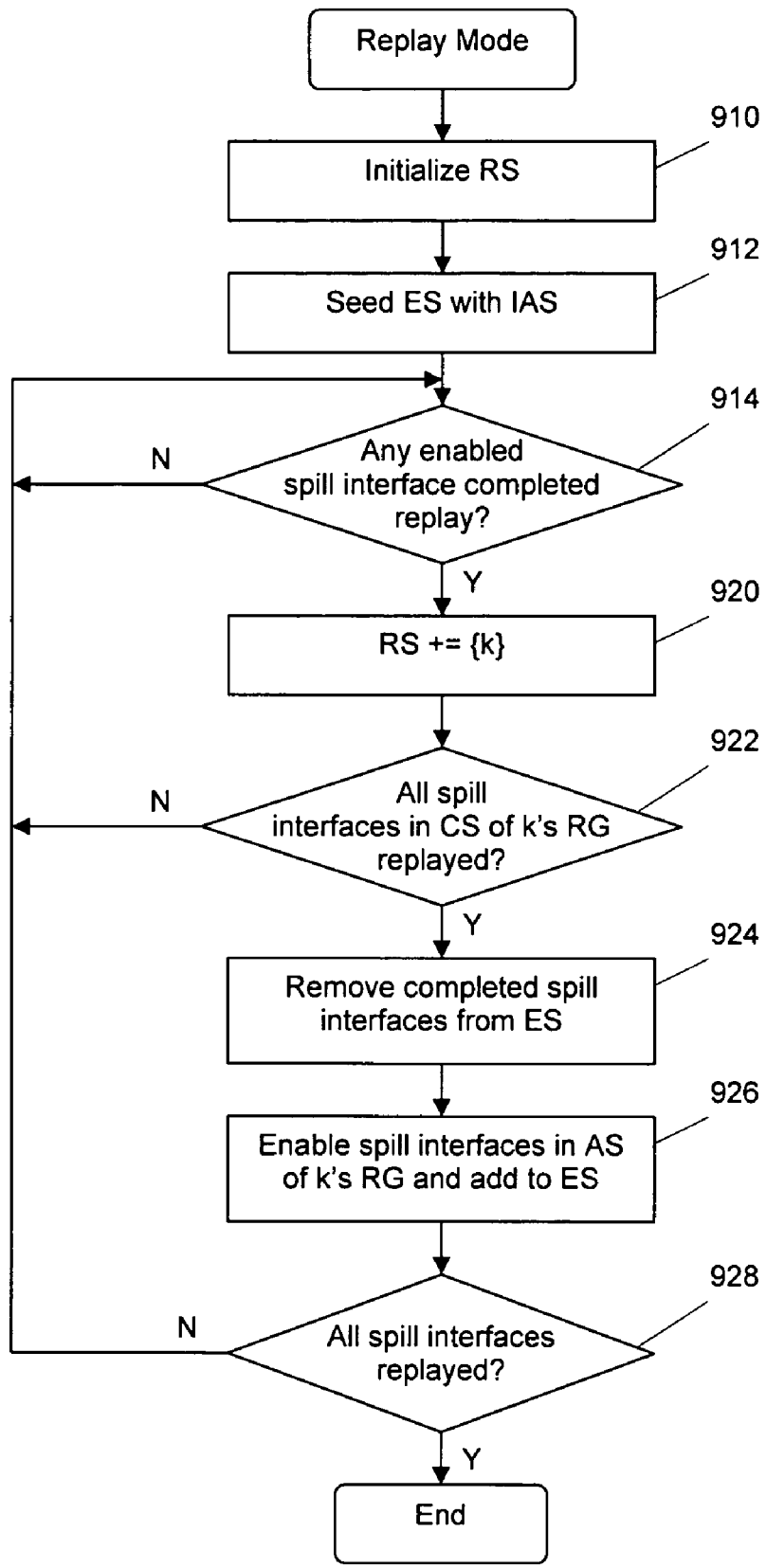
FIG. 9 is a flow diagram that illustrates the replay process that is carried out in accordance with a predetermined replay order.

FIG. 9 is a flow diagram that illustrates the replay process that is carried out in accordance with a predetermined replay order. In step 910, a retired set (RS) representing spill interfaces that have completed replay is initialized as a null set because there are no retired spill interfaces initially. In step 912, an enable set (ES) representing all enabled spill interfaces is seeded with IAS. In step 914, a check is made to see if any enabled spill interface has completed replay. If so, the event handling loop defined by steps 920 through 928 is entered.

The event handling loop begins by retiring the spill interface that completed replay (identified in FIG. 9 as spill interface k) (step 920). In step 922, a check is made to see if all spill interfaces that are in the completion set of k's replay group are in the retired set. If so, the spill interfaces that are in the completion set of k's replay group are removed from the enable set (step 924) and the spill interfaces that are in the activation set of k's replay group are enabled and added to the enable set (step 926). If not, the flow returns to step 914. In step 928, a check is made to see if all spill interfaces have been retired. If so, the replay process ends. If not, the flow returns to step 914, the event checking step.

Figure 10:
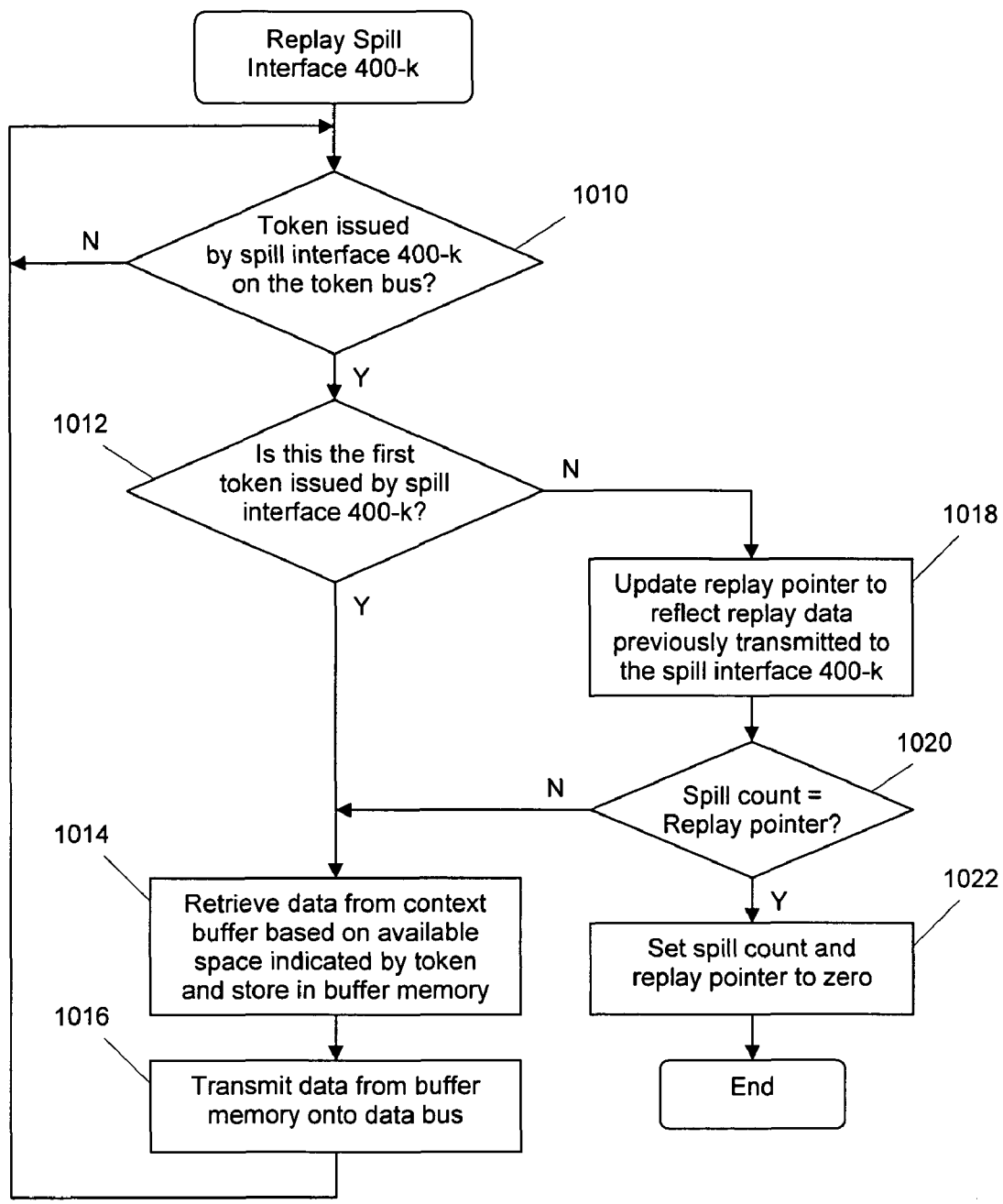
FIG. 10 is a flow diagram that illustrates the process steps carried out at the front end of the processing pipeline during replay of an interface unit of the type shown in FIG. 4.

FIG. 10 is a flow diagram that illustrates the process steps carried out by the spill arbiter 630 during the replay of any one particular spill interface (e.g., spill interface 400-k). In step 1010, the spill arbiter 630 examines the token bus 503 for a token issued by the spill interface 400-k. The first token issued by the spill interface 400-k during a replay cycle indicates the amount of available memory space in the spill interface 400-k. Subsequent tokens issued by the spill interface 400-k during the same replay cycle indicate the amount of available memory space in the spill interface 400-k, and also provide confirmation that replay data previously transmitted to the spill interface 400-k by the spill arbiter 630 were successfully received by the spill interface 400-k.

If the token issued by the spill interface 400-k is the first token issued by the spill interface 400-k during a replay cycle (step 1012), step 1014 and step 1016 are executed. In step 1014, the spill arbiter 630 retrieves data using the head address stored in the register memory 641 corresponding to the spill interface 400-k and the replay pointer stored in the register memory 644 corresponding to the spill interface 400-k, and stores the retrieved data in the buffer memory 640. The amount of data retrieved in this manner corresponds to the amount of available memory space indicated by the token. In step 1016, the data retrieved into the buffer memory 640 are transmitted onto the data bus 501 with the spill interface ID corresponding to the spill interface 400-k. After step 1016, the flow returns to step 1010.

If the token issued by the spill interface 400-k is not the first token issued by the spill interface 400-k during a replay cycle (step 1012), the spill arbiter 630 interprets the receipt of this token as confirmation that replay data previously transmitted to the spill interface 400-k by the spill arbiter 630 were successfully received by the spill interface 400-k. Therefore, in step 1018, the spill arbiter 630 updates the replay pointer stored in the register memory 644 corresponding to the spill interface 400-k based on the amount of replay data that were previously transmitted to the spill interface 400-k. In step 1020, the spill count stored in the register memory 643 corresponding to the spill interface 400-k is compared with the updated replay pointer stored in the register memory 644 corresponding to the spill interface 400-k. If the two are equal, this means that the replay for the spill interface 400-k has completed. Consequently, the spill count stored in the register memory 643 and the replay pointer stored in the register memory 644 are reset to zero (step 1022), and the process ends. If the two are not equal, step 1014 and step 1016 are executed in the manner described above. After step 1016, the flow returns to step 1010.

While the foregoing is directed to embodiments of the present invention, other and further embodiments of the invention may be devised without departing from the basic scope thereof. The scope of the present invention is determined by the claims that follow.

What is claimed is:

1. A method of processing a context switch from a first context to a second context in a processing pipeline including one or more processing units and an interface unit between a first processing unit and a second processing unit, comprising the steps of:
   halting processing of the second processing unit included in of the processing pipeline when switching from the first context to the second context;
   determining that the processing pipeline is operating in a spill mode, wherein, when in the spill mode, data transmitted to the second processing unit from other processing units included in the processing pipeline is redirected to a buffer memory only when the second processing unit is halted;
   determining that the first processing unit included in the processing pipeline is not idle;
   receiving tokens via a bus connected to an interface unit associated with the second unit, each token indicating an amount of memory space available in a buffer memory when the token is transmitted;
   examining a first token to determine an amount of the data to be transmitted to the second processing unit by the first processing unit that can be redirected to the buffer memory based on the memory space available in the buffer memory;
   redirecting the amount of the data to the buffer memory; and
   storing the amount of the data stored in the buffer memory in a first portion of an external memory reserved for the first context.

2. The method according to claim 1, wherein the step of redirecting modifies the first token based on the amount of the data being redirected to the buffer memory.

3. The method according to claim 1, further comprising the step of directing the data from the first processing unit to the second processing unit when the interface unit is in a normal mode.

4. The method according to claim 1, further comprising the step of receiving the data from the buffer memory and directing the data to the second processing unit when the interface unit is in a replay mode.

5. The method according to claim 1, further comprising the steps of:
   restoring the second processing unit with states associated with the second context;
   retrieving context data from a second portion of the external memory reserved for the second context storing the context data in the buffer memory; and
   directing the context data to the second processing unit.

6. The method according to claim 5, wherein the interface unit issues a token indicating the amount of memory space available in the buffer memory.

7. The method according to claim 6, wherein the context data retrieved from the second portion of the external memory is provided to said interface unit based on the token issued by said interface unit.

8. A processing pipeline for a computer system, comprising:
   a front end;
   a plurality of pipeline units arranged in series;
   a plurality of interface units between pipeline units, to form an alternating series of pipeline units and interface units; and
   a token bus connecting the front end and the interface units, wherein the interface units are operable in a normal mode and at least one other mode,
   wherein, in the normal mode, data from a first pipeline unit coupled upstream of the interface unit flows through the interface unit to a second pipeline unit coupled downstream of the interface unit,
   wherein, in the one other mode, the interface unit redirects the data from the first pipeline unit that are to be received by the second pipeline unit to a buffer memory in the front end only when the second pipeline unit is halted and the first pipeline unit is not idle, and
   wherein each interface unit is coupled to a different buffer memory and is configured to transmit tokens via the token bus to the front end, wherein a first token transmitted by an interface unit indicates an amount of memory space available in a buffer memory coupled to the interface unit when the token is transmitted.

9. The processing pipeline according to claim 8, wherein the interface units are also operable in a third mode, in which the interface unit receives data from the buffer memory in the front end and provides the data to the second pipeline unit.

10. The processing pipeline according to claim 9, further comprising a ring bus that connects the front end and the interface units in a ring configuration, through which the data are transmitted between the interface units and the buffer memory.

11. The processing pipeline according to claim 10, further comprising a mode bus connecting the front end and the interface units through which the front end communicates the mode of operation to the interface units.

12. The processing pipeline according to claim 9, wherein the buffer memory is interfaced with a memory for storing different contexts of the processing pipeline, and wherein, during a context switch from a first context to a second context, the contents of the buffer memory are dumped into the memory in a region reserved for the first context and part of the contents of the memory in a region reserved for the second context are retrieved into the buffer memory.

* * * * *